United States Patent [19]

Edwards et al.

[11] Patent Number: 5,005,922
[45] Date of Patent: Apr. 9, 1991

[54] DOUBLE V-SHAPED ENDLESS TRACK DRIVE SYSTEM

[75] Inventors: John W. Edwards, Brandon; Daniel R. Harper; Quinton B. McNew, both of Ft. Myers, all of Fla.

[73] Assignee: Edwards, Harper, McNew & Company, Ft. Myers, Fla.

[21] Appl. No.: 411,885

[22] Filed: Sep. 22, 1989

Related U.S. Application Data

[63] Continuation of Ser. No. 261,933, Oct. 25, 1988, Pat. No. 4,884,852, which is a continuation-in-part of Ser. No. 113,670, Oct. 28, 1987, which is a continuation-in-part of Ser. No. 51,830, May 20, 1987, Pat. No. 4,906,054, which is a continuation-in-part of Ser. No. 49,819, May 14, 1987, Pat. No. 4,861,120.

[51] Int. Cl.$^5$ .............................................. B62D 55/24
[52] U.S. Cl. .................. 305/35 EB; 305/40; 305/56
[58] Field of Search .................. 305/12, 35 R, 35 EB, 305/37, 38, 39, 40, 41, 46, 51, 54, 55, 57, 56

[56] References Cited

U.S. PATENT DOCUMENTS

| | | |
|---|---|---|
| 296,998 | 4/1884 | Page . |
| 394,335 | 12/1888 | Chase . |
| 893,787 | 7/1908 | Conklin . |
| 902,224 | 10/1908 | Fouillaron . |
| 905,405 | 12/1908 | Britton . |
| 1,217,007 | 2/1917 | Jory . |
| 1,300,814 | 4/1919 | Burch . |
| 1,400,100 | 12/1921 | Reddaway . |
| 1,420,531 | 6/1922 | Dutkiewicz et al. . |
| 1,507,458 | 9/1924 | Dreyer . |
| 1,693,833 | 12/1928 | Worley . |
| 1,789,084 | 1/1931 | Schwarz . |
| 1,814,046 | 7/1937 | Kegresse . |

(List continued on next page.)

OTHER PUBLICATIONS

Caterpillar, "CAT Challenger 65", Dec. 1986 (brochure).
Mike Osenga, "Caterpillar's New Rubber-Tracked Farm Tractor", Mar. 1987, pp. 25-26, from Diesel Progress North American (magazine).
Brendan M. Greeley, Jr., "Caterpillar, Martin Marietta Roll Out Prototype Hard Mobile ICBM Launcher", 9/16/85, pp. 24-25, Aviation Week & Space Technology.
Caterpillar brochure, "Cat Challenger 65", Feb. 1987, 10 pages.
Caterpillar brochure (undated), entitled "CAt Challenger 65 The Total Field Machine", 12 pages.
Fabricon 81 brochure, Vannerflex TM, "Cleated Conveyor Belting for Industry", pp. 1-17, Portland, Oregon.
MaCarthur Press (Books) Pty. Ltd., "Blackwoods General Catalogue", published in Australia in 1979, p. 841.

*Primary Examiner*—Russell D. Stormer
*Attorney, Agent, or Firm*—Oliff & Berridge

[57] ABSTRACT

An endless drive track for use on a track vehicle such as a bulldozer includes a plurality of polymeric endless track drive members, each drive member including a first lateral frictional drive face sloping inwardly with respect to a transverse direction of the endless drive track at a first angle with respect to horizontal and a second lateral frictional drive face sloping inwardly with respect to the transverse direction of the endless drive track at a second angle with respect to horizontal, and a reinforcement member for connecting the drive members to one another to form an endless track. Each drive member of the endless track preferably includes first and second lateral frictional drive faces sloping inwardly toward one another at the first angle with respect to horizontal and third and fourth lateral frictional drive faces, above the first and second drive faces, sloping inwardly toward one another at the second angle with respect to horizontal, the second angle being greater than the first angle. The endless drive track preferably is utilized with a drive wheel which has drive surfaces sloped and shaped to match the lateral frictional drive faces of the drive members.

31 Claims, 9 Drawing Sheets

FOREIGN PATENT DOCUMENTS

| | | |
|---|---|---|
| 205109 | 12/1956 | Australia . |
| 248747 | 1/1964 | Australia . |
| 560157 | 7/1958 | Canada . |
| 922346 | 3/1973 | Canada . |
| 948243 | 5/1974 | Canada . |
| 0176675 | 4/1986 | European Pat. Off. . |
| 473073 | 3/1929 | Fed. Rep. of Germany . |
| 533398 | 8/1931 | Fed. Rep. of Germany . |
| 928509 | 6/1955 | Fed. Rep. of Germany . |
| 1149255 | 12/1960 | Fed. Rep. of Germany . |
| 1918554 | 1/1965 | Fed. Rep. of Germany . |
| 2149557 | 4/1973 | Fed. Rep. of Germany . |
| 3319067 | 11/1984 | Fed. Rep. of Germany . |
| 710824 | 10/1931 | France . |
| 798665 | 5/1936 | France . |
| 60756 | 1/1955 | France . |
| 1117612 | 5/1956 | France . |
| 2378669 | 8/1978 | France . |
| 2471905 | 12/1979 | France . |
| 2486482 | 1/1982 | France . |
| 55-55063 | 4/1980 | Japan . |
| 57-144175 | 6/1982 | Japan . |
| 8502824 | 7/1985 | PCT Int'l Appl. . |
| 61597 | 11/1925 | Sweden . |
| 27210 | 2/1902 | Switzerland . |
| 170900 | 10/1934 | Switzerland . |
| 350200 | 12/1960 | Switzerland . |
| 106353 | 5/1917 | United Kingdom . |
| 223515 | 10/1924 | United Kingdom . |
| 649378 | 1/1951 | United Kingdom . |
| 1604615 | 12/1981 | United Kingdom . |
| 2104015 | 3/1983 | United Kingdom . |
| 8500566 | 2/1985 | World Int. Prop. O. . |

U.S. PATENT DOCUMENTS

| | | |
|---|---|---|
| 1,821,196 | 9/1931 | Worley . |
| 1,862,784 | 6/1932 | Choate . |
| 1,895,241 | 1/1933 | Worley . |
| 1,898,035 | 2/1933 | Diamond . |
| 1,911,184 | 5/1933 | Flynn . |
| 1,966,831 | 7/1934 | Oakes et al. . |
| 1,970,756 | 8/1934 | Lamb . |
| 1,973,214 | 9/1934 | Lamb . |
| 1,975,726 | 10/1934 | Martinage . |
| 2,025,007 | 12/1935 | Wendling . |
| 2,037,983 | 4/1936 | Johnston . |
| 2,116,834 | 5/1933 | Kegresse . |
| 2,290,109 | 7/1942 | Mayne . |
| 2,309,648 | 2/1943 | Kelly . |
| 2,318,992 | 5/1943 | Gray . |
| 2,322,466 | 6/1943 | Perry . |
| 2,326,719 | 8/1943 | Myers . |
| 2,338,817 | 1/1944 | Mayne . |
| 2,342,953 | 2/1944 | Mayne . |
| 2,345,763 | 4/1944 | Mayne . |
| 2,350,076 | 5/1944 | Smith et al. . |
| 2,374,240 | 4/1945 | Shankman . |
| 2,376,802 | 5/1945 | Morse . |
| 2,385,453 | 9/1945 | Leguillon . |
| 2,387,802 | 10/1945 | Mayne . |
| 2,410,507 | 11/1946 | Knight . |
| 2,412,122 | 12/1946 | Campbell . |
| 2,449,421 | 8/1948 | Slemmons et al. . |
| 2,449,950 | 9/1948 | Nassimbene . |
| 2,476,460 | 7/1949 | Smith . |
| 2,476,828 | 7/1949 | Skramme . |
| 2,487,813 | 11/1949 | Knox . |
| 2,531,111 | 11/1950 | Daniels . |
| 2,537,745 | 1/1951 | Daniels . |
| 2,541,177 | 2/1951 | Slemmons . |
| 2,592,541 | 4/1952 | Curtis . |
| 2,592,916 | 4/1952 | Leguillon . |
| 2,608,875 | 9/1952 | Ellison et al. . |
| 2,728,612 | 12/1955 | Howe et al. . |
| 2,732,265 | 1/1956 | Cuthbertson . |
| 2,733,965 | 2/1956 | Gladden . |
| 2,735,728 | 2/1956 | Powell . |
| 2,796,303 | 6/1957 | Atkinson . |
| 2,803,504 | 8/1957 | Lynch . |
| 2,815,988 | 12/1957 | Dowell et al. . |
| 2,823,082 | 2/1958 | Bauer, Jr. . |
| 2,845,308 | 7/1958 | Woltemar . |
| 2,864,154 | 12/1958 | Sausaman . |
| 2,900,210 | 8/1959 | Parsons . |
| 2,984,120 | 5/1961 | Hurry . |
| 3,013,844 | 12/1961 | Mazzarins . |
| 3,019,062 | 1/1962 | Long . |
| 3,068,711 | 12/1962 | Even . |
| 3,093,006 | 6/1963 | Gamaunt . |
| 3,104,113 | 9/1963 | Montz . |
| 3,105,390 | 10/1963 | Funke et al. . |
| 3,118,709 | 1/1964 | Case . |
| 3,133,767 | 5/1964 | Wunsch . |
| 3,223,462 | 12/1965 | Dalrymple . |
| 3,232,679 | 2/1966 | Katzenberger . |
| 3,250,577 | 5/1966 | Olson . |
| 3,327,359 | 6/1967 | Wiese . |

(List continued on next page.)

U.S. PATENT DOCUMENTS

| | | |
|---|---|---|
| 3,346,306 | 10/1967 | Siber . |
| 3,373,067 | 3/1968 | Hagstrom . |
| 3,439,959 | 4/1969 | Bowen et al. . |
| 3,451,728 | 6/1969 | Bruneau . |
| 3,480,339 | 11/1969 | Kell . |
| 3,484,140 | 12/1969 | Grenier . |
| 3,567,291 | 3/1971 | Paulson . |
| 3,604,763 | 9/1971 | Maguire . |
| 3,606,497 | 9/1971 | Gilles . |
| 3,606,921 | 9/1971 | Grawey . |
| 3,618,384 | 11/1971 | Bierlein . |
| 3,625,574 | 12/1971 | Plastino . |
| 3,630,580 | 12/1971 | Grawey et al. . |
| 3,645,586 | 2/1972 | Piepho . |
| 3,703,321 | 11/1972 | Schoonover . |
| 3,714,838 | 2/1973 | Gilson . |
| 3,717,391 | 2/1973 | Snellman et al. . |
| 3,734,576 | 5/1973 | Heiple et al. . |
| 3,734,577 | 5/1973 | Snellman . |
| 3,736,032 | 5/1973 | Mosshart et al. . |
| 3,758,171 | 9/1973 | Plastino . |
| 3,771,844 | 11/1973 | Perreault . |
| 3,773,394 | 11/1973 | Grawey . |
| 3,808,901 | 5/1974 | Berg . |
| 3,857,617 | 12/1974 | Grawley . |
| 3,858,948 | 1/1975 | Johnson et al. . |
| 3,880,478 | 4/1975 | Baylor . |
| 3,888,132 | 6/1975 | Russ, Sr. . |
| 3,899,219 | 8/1975 | Boggs . |
| 3,899,220 | 8/1975 | Grawey et al. . |
| 3,900,231 | 8/1975 | Ohm . |
| 3,955,855 | 5/1976 | Massieon et al. . |
| 3,993,366 | 11/1976 | Orpana . |
| 4,023,865 | 5/1977 | Morissette . |
| 4,041,789 | 8/1977 | Hoback . |
| 4,093,318 | 6/1978 | Edwards . |
| 4,099,794 | 7/1978 | Hoffart . |
| 4,141,599 | 2/1979 | Stolz . |
| 4,141,600 | 2/1979 | Orpana . |
| 4,145,092 | 3/1979 | Kasin . |
| 4,148,225 | 4/1979 | Redmond, Jr. et al. . |
| 4,175,796 | 11/1979 | Boggs et al. . |
| 4,185,877 | 1/1980 | Tanoue et al. . |
| 4,198,103 | 4/1980 | Ward et al. . |
| 4,203,633 | 5/1980 | Hare . |
| 4,217,006 | 8/1980 | Dehnert . |
| 4,278,302 | 7/1981 | Westimayer et al. . |
| 4,281,882 | 8/1981 | van der Lely . |
| 4,349,234 | 9/1982 | Hartmann . |
| 4,359,248 | 11/1982 | Kortering . |
| 4,362,340 | 12/1982 | van der Lely . |
| 4,365,965 | 12/1982 | Russ, Sr. . |
| 4,410,219 | 10/1983 | van der Lely . |
| 4,448,273 | 5/1984 | Barbieri . |
| 4,449,958 | 5/1984 | Conrad . |
| 4,452,496 | 6/1984 | van der Lely . |
| 4,457,565 | 7/1984 | Bissi et al. . |
| 4,470,641 | 9/1984 | Swarthout . |
| 4,473,366 | 9/1984 | Cataldo . |
| 4,474,414 | 10/1984 | Tokue . |
| 4,484,903 | 11/1984 | Schneider . |
| 4,504,342 | 3/1985 | Marsh et al. . |
| 4,506,934 | 3/1985 | Hammond . |
| 4,522,452 | 6/1985 | Wohlford . |
| 4,530,546 | 7/1985 | Meisel, Jr. . |
| 4,541,822 | 9/1985 | Stiles . |
| 4,548,663 | 10/1985 | Worcester . |
| 4,569,561 | 2/1986 | Edwards et al. . |
| 4,579,547 | 4/1986 | McComber et al. . |
| 4,594,846 | 1/1986 | Livesay et al. . |
| 4,595,385 | 6/1986 | Henderson . |
| 4,595,387 | 6/1986 | Frazier et al. . |
| 4,611,860 | 9/1986 | Wohlford et al. . |
| 4,616,883 | 10/1986 | Edwards et al. . |
| 4,618,190 | 10/1986 | Garman et al. . |
| 4,636,014 | 1/1987 | Dennison et al. . |
| 4,637,665 | 1/1987 | Burdick et al. . |
| 4,642,080 | 2/1987 | Takano et al. . |
| 4,650,444 | 3/1987 | Sakakibara et al. . |
| 4,687,261 | 8/1987 | Atkin . |
| 4,721,498 | 1/1988 | Grob . |
| 4,781,876 | 11/1988 | Kia . |

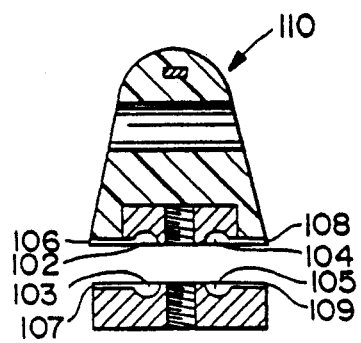 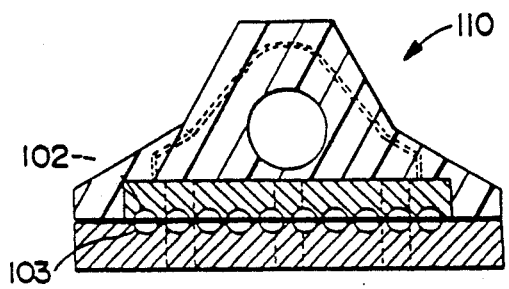
Fig. 24  Fig. 25
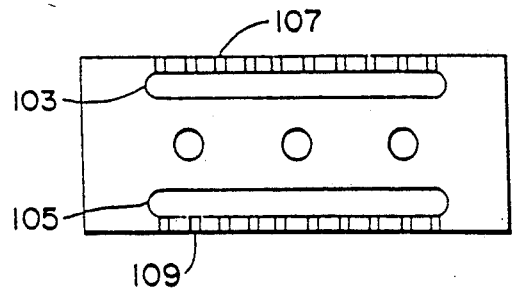
Fig. 26
Fig. 27
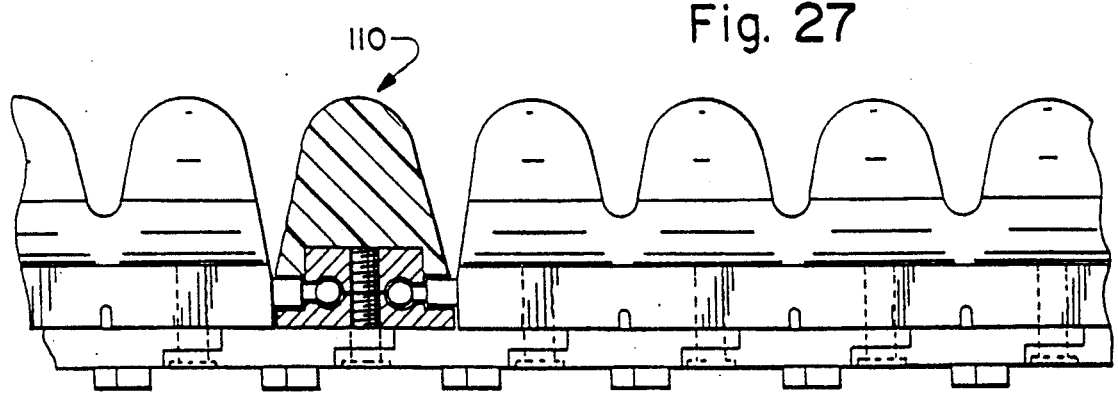
Fig. 28
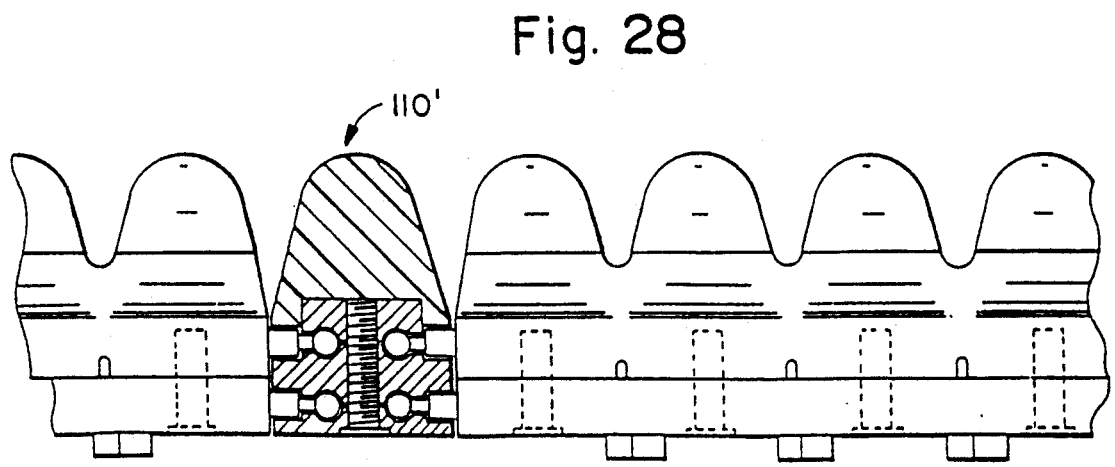

DOUBLE V-SHAPED ENDLESS TRACK DRIVE SYSTEM

This application is a continuation of U.S. application Ser. No. 261,933 filed Oct. 25, 1988 and now U.S. Pat. No. 4,884,852; which is a continuation-in-part of Ser. No. 113,670 filed Oct. 28, 1987; which is a continuation-in-part of Ser. No. 051,830 filed May 20, 1987 and now U.S. Pat. No. 4,906,054; which is a continuation-in-part of Ser. No. 049,819 filed May 14, 1987 and now U.S. Pat. No. 4,861,120. U.S. application Ser. Nos. 113,670, 051,830, and 049,819 are fully incorporated herein by reference.

BACKGROUND OF THE INVENTION

The present invention relates to an endless track drive system. Endless track drive systems are used on vehicles such as tractors, bulldozers and tanks.

Many efforts have been made to improve endless track drive systems In Edwards U.S. Pat. No. 4,093,318 issued June 6, 1978 (fully incorporated herein by reference), an endless track drive system is disclosed and claimed which includes a plurality of endless track drive sections, each section having a substantially flat contact surface and sloped surfaces to distribute weight and shed dirt and other foreign objects. Although U.S. Pat. No. 4,093,318 represented a marked improvement in endless track drive systems existing prior to that time the pivotal means of connecting the endless track drive sections was subject to excessive wear, and the endless track drive system there disclosed continued to be excessively costly and time-consuming to make, and it was further found that dirt and foreign objects continued to interfere with proper operation of the endless track drive system, although again not to the extent of track drive systems existing prior thereto.

In further recent developmental work Edwards and his partners/co-inventors Harper and McNew have further improved upon the endless track drive system disclosed in Edwards U.S. Pat. No. 4,093,318. Their U.S. Pat. Nos 4,569,561 issued Feb. 11, 1986, and 4,616,883 issued Oct. 14, 1986 (both full incorporated herein by reference), disclose and claim an endless track drive system made up of a number of drive sections interconnected by cable connector sections. As there disclosed, the drive sections have sloping sides with removable rubber wear pads, and the cable connector sections include cables encased in rubber or other similar suitable material. As a result of such features, the endless track drive system disclosed and claimed therein experiences improved flexibility and tensile strength, reduced noise, and reduced maintenance. The detrimental effects of dirt and debris are likewise mitigated.

Despite the marked improvement in endless track drive systems resulting from the recent work of Edwards, Harper and McNew, as represented in U.S. Pat. Nos. 4,569,561 and 4,616,883, there remains a need for simplification in the manufacture and use of even that improved endless track drive system. Furthermore, the industry is always interested in and receptive to mitigating even further the effects of dirt and debris on endless track drive systems because of the resulting operational problems, downtime and increased maintenance.

An endless track drive system is also known which utilizes a friction drive elastomeric closed loop endless drive track, such as the one depicted in FIGS. 21 and 22 herein. As there depicted, this endless track drive system 81 comprises an elastomeric closed loop endless drive track 82 with tread members 84 and guide members 83 joined to and extending in a direction internally of the drive track. The drive track 82 has reinforcement elements 85a–85d, and is driven by drive wheels 86 in frictional contact with flat lands 82a of drive track 82. This type of endless track drive system is disclosed in PCT Publication No. WO 85/2824 (July 4, 1985).

Unfortunately, the above-discussed endless track drive system of PCT Publication No. WO 85/2824 suffers from a number of deficiencies. For example, in certain types of terrains vehicles equipped with such an endless track drive system have experienced unacceptable slippage, thereby preventing optimal utilization of such vehicles over such terrains. Secondly, although the friction drive wheels of such endless track drive system were designed to dissipate dirt and debris, entrapment of dirt and debris continues to be a problem due to the horizontal engagement between the drive wheels and the drive track.

Thus, there remains a need for an improved endless track drive system which overcomes the foregoing problems.

SUMMARY OF THE INVENTION

Accordingly, the present invention has been developed to overcome the foregoing shortcomings of the prior most recent improved endless track drive system developed by Edwards, Harper and McNew, and to provide an endless track drive system which has an improved construction, is simpler less costly and less time-consuming to manufacture and use, and which is less susceptible to interference by dirt and debris.

The present invention also has been developed to overcome the foregoing shortcomings of the above-discussed elastomeric closed loop endless track drive system including elimination of slippage.

It is therefore an object of the present invention to provide an endless track drive system with improved construction which is more resistant to contamination by dirt, sand, gravel and other foreign objects.

It is yet another object of the present invention to provide an endless track drive system which can be efficiently and economically manufactured and utilized.

It is yet still another object of the present invention to provide an endless track drive system which be can utilized over varying terrains without slippage between drive wheels and drive track.

Thus, in accordance with one aspect of the present invention the shortcomings of existing endless track drive systems are overcome by an endless drive track comprising a plurality of polymeric endless track drive members, each said drive member including a first lateral frictional drive face sloping inwardly with respect to a transverse direction of said endless drive track at a first angle with respect to horizontal and a second lateral frictional drive face sloping inwardly with respect to said transverse direction of said endless drive track at a second angle with respect to horizontal, and means for connecting said drive members to one another to form said endless drive track.

In accordance with another aspect of the present invention, the first lateral frictional drive face is positioned below the second lateral frictional drive face.

In accordance with yet another aspect of the present invention, the second angle is greater than the first angle.

In accordance with still another aspect of the present invention, the first lateral frictional drive faces of the plurality of drive members are integrally interconnected to form continuous drive face around the endless drive track.

In accordance with still a further aspect of the present invention, grooves are formed between the drive members to assist in removal of dirt and debris and increase the flexibility of the endless drive track.

In accordance with yet further aspects of the present invention, the plurality of drive members are either integrally interconnected in a closed loop, or adjacent ends of the plurality of drive members are joined by at least one master link.

In accordance with yet another aspect of the present invention, an endless track drive system includes the foregoing endless drive track in connection with a drive wheel the drive wheel including drive surfaces sloped and/or shaped to correspond with the drive faces of the drive members for frictional engagement therewith.

In accordance with still another aspect of the present invention, the drive wheel of the endless track drive system further includes a sprocket for engaging with another drive face on each of the drive members, thereby further driving the endless track drive system.

In accordance with still further aspects of the present invention, at least one tread member is fixed to the plurality of drive members, each drive member further comprises a base portion and support structure extending from the base portion and/or means are provided for scraping dirt and debris from the endless track drive system.

These and other aspects and advantages of the present invention are described in or apparent from the following detailed description of the preferred embodiments.

BRIEF DESCRIPTION OF THE DRAWINGS

The preferred embodiments are described with reference to the drawings in which:

FIG. 24 is a longitudinal sectional view of a master link in accordance with the present invention;

FIG. 25 is a transverse sectional view of the master link of FIG. 24;

FIG. 26 is a plan view of the lower base portion part of the master link of FIG. 24;

FIG. 27 is a longitudinal sectional view of the master link of FIG. 24 linking the two ends of an endless drive track;

FIG. 28 is a longitudinal sectional view of a master link in accordance with another embodiment of the present invention linking the two ends of an endless drive track and the two ends of a reinforced continuous removable tread member in accordance with the present invention;

DESCRIPTION OF THE PREFERRED EMBODIMENTS

Figure 1:
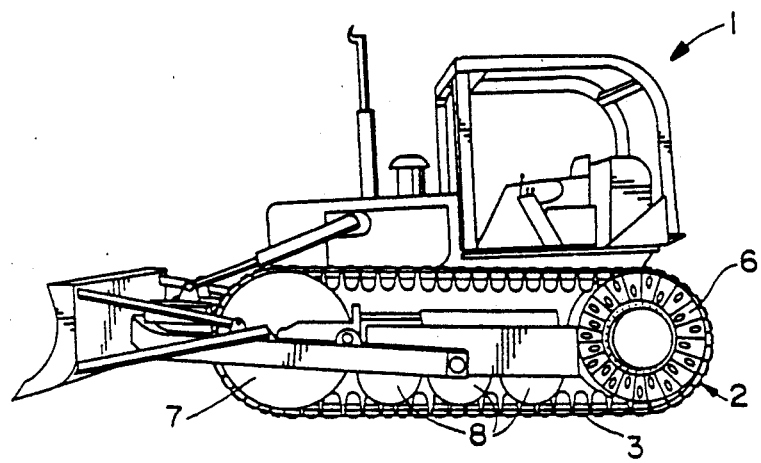
FIG. 1 is a perspective view of a bulldozer equipped with an endless track drive system in accordance with the present invention.

FIG. 1 depicts an endless track drive system 2 in accordance with a first embodiment of the present invention installed on a bulldozer 1. FIG. 1 depicts only one endless track drive system, but it will be understood that the typical track vehicle is equipped with at least two such systems.

Each endless track drive system 2 is made up of a closed loop endless track 3 in conjunction with the necessary drive wheel 6 and any necessary supporting wheels, such as opposite end wheel 7 and idler wheels or rollers 8. The endless track is installed so as to pass around the wheels 6, 7 and 8. The idler wheels 8 are irregularly spaced so as not to simultaneously engage like points on the endless track, thereby preventing undue vibrations. Of course, the track vehicle is further equipped with the necessary power source and controls to power the endless track drive system 2 and thereby propel the vehicle over varying terrain as desired.

Figure 2:
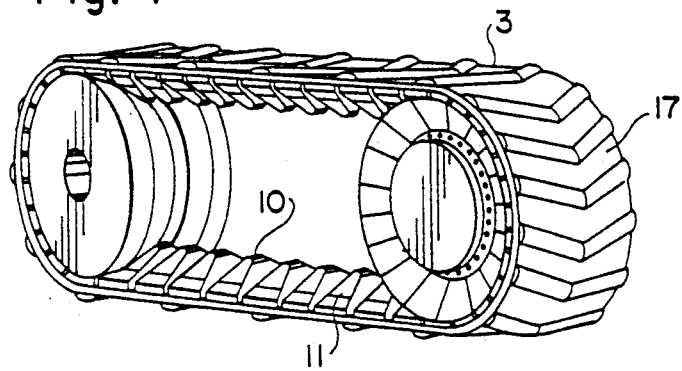
FIG. 2 is a partial enlarged view of the endless track drive system of FIG. 1, including an endless track in accordance with the present invention.
Figure 3:
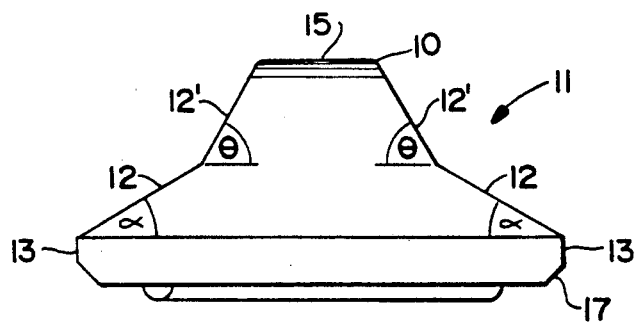
FIG. 3 is a transverse elevation view of one of the drive members of the endless track of FIG. 2.
Figure 4:
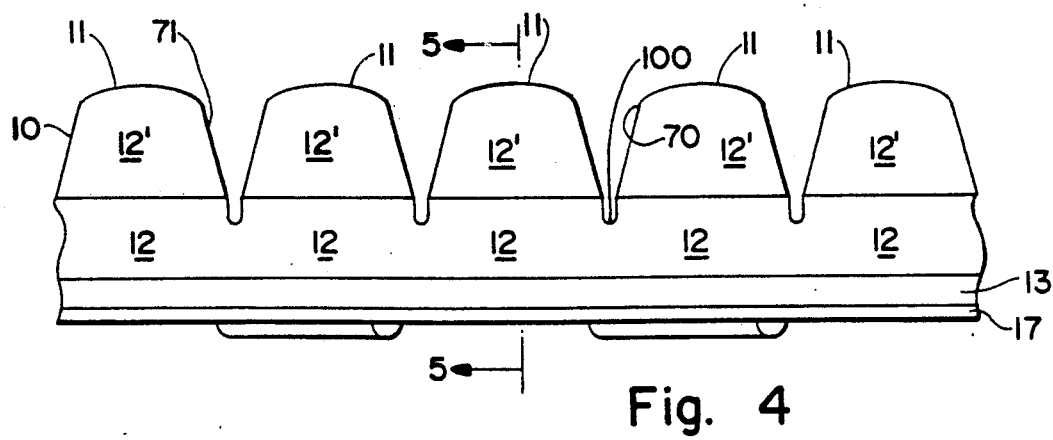
FIG. 4 is a partial longitudinal elevation view of the endless track of FIG. 2.
Figures 5, 6:
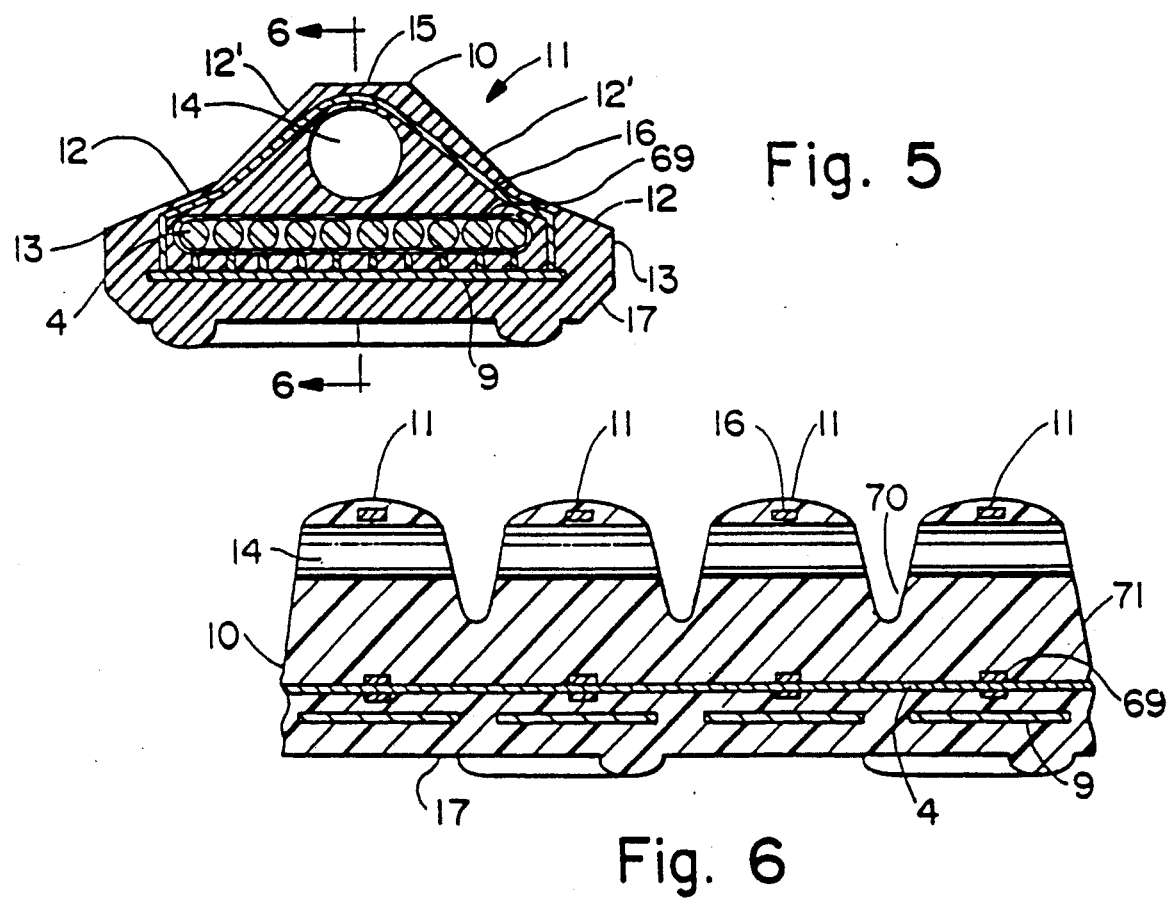
FIG. 5 is a transverse sectional view of the endless track of FIG. 2 taken along the line 5—5 of FIG. 4.
FIG. 6 is a partial longitudinal sectional view of the endless track of FIG. 2 taken along the line 6—6 of FIG. 5.

FIGS. 2-8 further depict the endless track 3 in accordance with the first embodiment of the present invention. Endless track 3 comprises a continuous, closed loop structure 10, preferably constructed of a polymeric material. The polymeric structure is preferably molded, but may be constructed in other ways. The polymeric structure may be formed of any polymeric material which will provide a suitable frictional drive surface with limited operational noise; examples are rubber, polyurethane, or other plastics As shown in FIGS. 2, 4 and 6, the polymeric structure 10 is formed into a plurality of integrally interconnected polymeric drive members 11.

Figure 7:
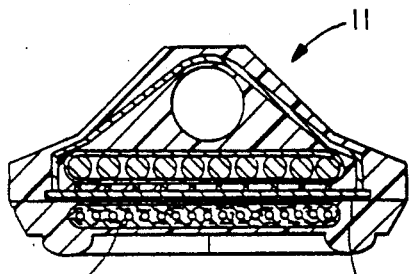
FIG. 7 is a transverse sectional view of the endless track of FIG. 2 similar to FIG. 5 and depicting a bias-ply, fiber reinforced tread member.
Figure 8:
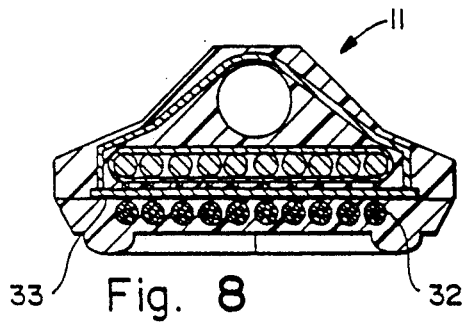
FIG. 8 is a transverse sectional view of the endless track of FIG. 2 similar to FIG. 5 and depicting a cable reinforced tread member.

Encased within the polymeric structure 10 is at least one continuous, closed loop reinforcement member 4, the reinforcement member 4 both reinforcing the endless track 3 and interconnecting adjacent drive members 11 to form the endless track. The reinforcement members 4 are preferably steel cables, but also may be made of other metals or materials such as nylon or other high strength light weight cord or fabric. Although ten reinforcement members are depicted in FIGS. 5, 7 and 8, it will be appreciated that any desired number of reinforcement members may be utilized. It will further be appreciated that the reinforcement members 4 must be suspended within the mold prior to the forming of polymeric structure 10 so that reinforcement members 4 may be encased within the polymeric structure.

As depicted, each drive member 11 includes at least one drive face 12 and at least one drive face 12'. Each drive member 11 preferably is formed with two lateral frictional drive faces 12 which slope inwardly toward one another with respect to a transverse direction of the endless track at a first angle $\alpha$ with respect to horizontal to form substantially a first truncated inverted V-shaped transverse cross section, and two lateral frictional drive faces 12' which slope inwardly toward one another with respect to a transverse direction of the endless track at a second angle $\theta$ with respect to horizontal to form substantially a second truncated inverted V-shaped transverse cross section. The angle $\alpha$ is preferably in the range of 5°-25° with respect to horizontal, and most preferably approximately 15°, and the angle $\theta$ is preferably in the range of 30°-75° with respect to horizontal, and most preferably approximately 60°. Of course, other angles of slope from 1°-89° also may be chosen and drive members 11 also may be provided with any suitable type number and configuration of drive faces. For example, each drive member 11 could be provided with four lateral frictional drive faces which slope outwardly with respect to a transverse direction of the endless track at angles $\alpha$ and $\theta$ with respect to horizontal thereby providing drive members 11 with concave double truncated V-shaped transverse cross sections. Other configurations will further be understood from the above disclosure.

The double truncated inverted V-shaped profile of the drive members 11 is quite advantageous. It has been determined that a steep drive face slope provides optimum drive capability, whereas a shallower drive face slope provides greater durability. Accordingly, the disclosed drive member profile combines the foregoing advantages by incorporating both relatively steep and relatively shallow drive faces. Furthermore since all drive faces are sloped, all of the drive faces shed dirt and debris which have been a substantial problem for prior endless track drive systems.

Figure 13:
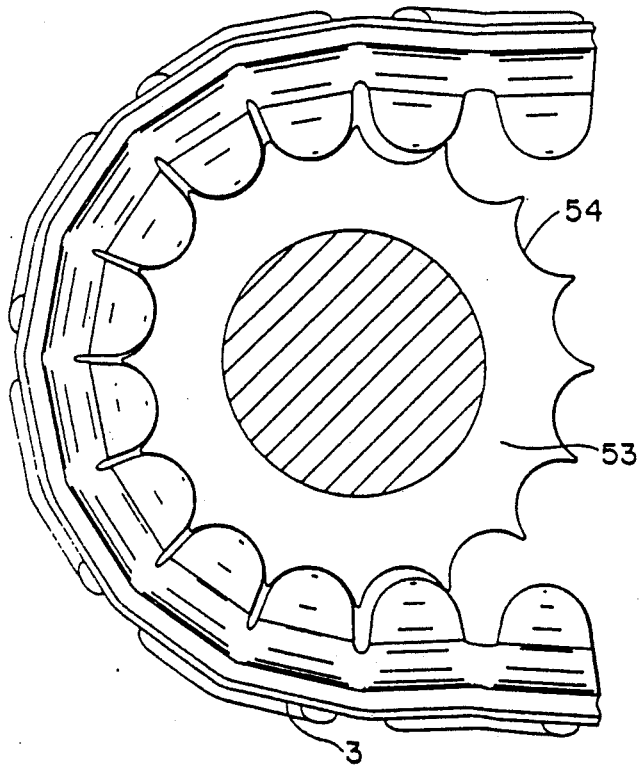
FIG. 13 is a sectional view taken through an axle of a drive wheel in accordance with an embodiment of the present invention depicting the endless track engaged with a sprocket.

Drive faces 12 of the various drive members 11 are preferably integrally interconnected to form a continuous drive face around the endless track as depicted in FIG. 4. In this case, grooves 100 are preferably provided between drive members 11 to assist in removal of dirt and debris and increase the flexibility of the endless track (i.e. render it easier for the endless track to bend around the drive wheel as shown in FIG. 13). Grooves 100 are formed transversely of the endless track between drive members 11, and extend through the upper portion of continuous drive face 12 as shown in FIG. 4. Grooves 100 may be provided perpendicular to the longitudinal axis of the endless track or may be angled so as to eliminate vibration between the grooves and the vehicle wheels.

Figure 30:
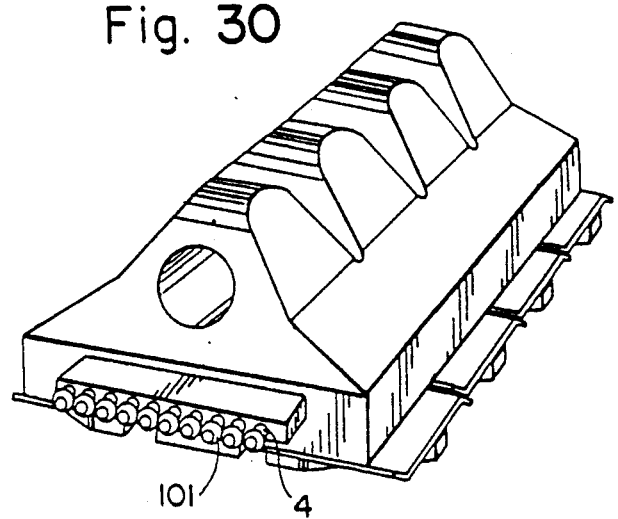
FIG. 30 depicts a partial endless drive track with spherical retaining members for utilization with the master link of the present invention.

An additional upper drive surface 15 also may be formed on each drive member 11 for either frictional drive or sprocket drive by an axle of drive wheel 6 to be described below. As viewed transversely of the endless drive track, the upper drive surface 15 is narrower at its uppermost point than it is further down toward the drive track (see FIGS. 30 and 31) thus optimizing removal of dirt and debris. Drive members 11 also may have front and rear edges (lateral drive face side edges) 70, 71 which are inwardly sloped with respect to longitudinal direction of the endless track drive system so that such edges will lie substantially parallel to one another as they proceed around drive wheel 6 of the track vehicle (see FIG. 13), thereby providing smoother operation, permitting use of a sprocket, and further reducing influx of detrimental dirt and debris. The gaps between adjacent drive members resulting from sloped edges 70 and 71 further permit dirt and debris to escape along straight runs of the endless track, and these gaps may vary in size without detriment to their dirt removal function. Drive members 11 also may be provided with vertically extending planar portions 13 below drive faces 12 so that externally directed portions of drive members 11 will extend beyond the radial peripheries of wheels 6 and 7 thereby raising the track vehicle 1 higher above the terrain to further protect the structural mechanisms of the track vehicle from dirt and debris (see FIG. 16). To reduce the mass of drive track 3, and also reduce consumption of polymeric material and consequent cost, one or more holes 14 also optionally may be formed in each drive member.

Each drive member 11 also optionally may include a base portion 9, and a support structure 16 fastened to each base portion 9 by welding, screws, bolts or other fastening means, in order to further reinforce drive members 11 and render it easier to mold polymeric structure 10. An additional support structure 69 also may be provided for suspending cables 4 above base portions 9 and further securing base portions 9 to polymeric structure 10. Base portions 9 preferably are made of steel or other metal, but may be made of some other strong, rigid material. Support structures 16 and 69 may be in the form of metal straps, or may be made from a rigid plastic material or other suitable rigid substance. Support structure 16 is preferably shaped to conform with the desired configuration of drive faces 12 and 12', but may be shaped in other configurations to serve its intended purposes. Support structure 69 likewise may be configured in a number of ways other than as shown.

As depicted in FIGS. 2–8, endless track 3 also preferably includes polymeric tread members 17 which are integrally molded or otherwise integrally formed as part of the endless track (see FIGS. 3–6), or are permanently bonded thereto with adhesive or other bonding agent 33 (see FIGS. 7 and 8). Tread members 17 also may include a bias-ply fiber reinforcement layer 68 as depicted in FIG. 7 or may include reinforcing cables 32 of steel or other material as depicted in FIG. 8.

Figure 9:
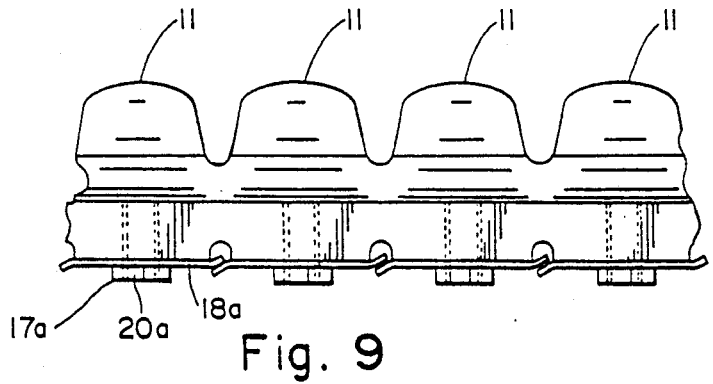
FIG. 9 is a partial longitudinal elevation view of the endless track of FIG. 2 equipped with removable tread members.
Figure 10:
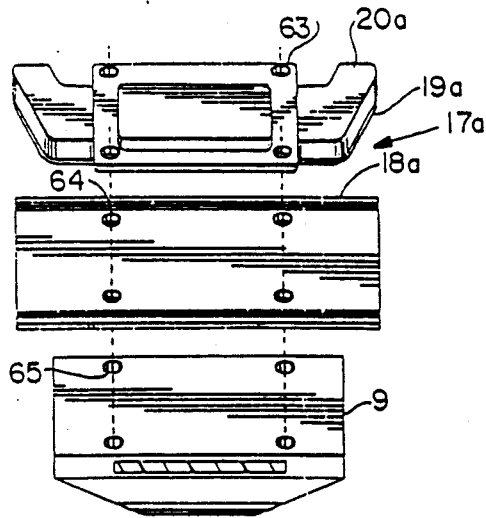
FIG. 10 is an exploded view of an endless track drive member and the removable tread member of FIG. 9.

Alternatively, as depicted in FIGS. 9–12, tread members may be removably fixed to the various drive members 11. For example, removable tread members 17a may each include a metal backing plate 18a and a polymeric tread 20a bonded to a metal supporting plate 19a as depicted in FIGS. 9 and 10. As shown in FIG. 10, these individual treads and backing plates each preferably have four unthreaded holes 63 and 64, respectively and are removably fastened to each of the base portions 9 of drive members 11 with suitable bolts or other fastening means received in threaded holes 65 of the base portions.

Figure 11:
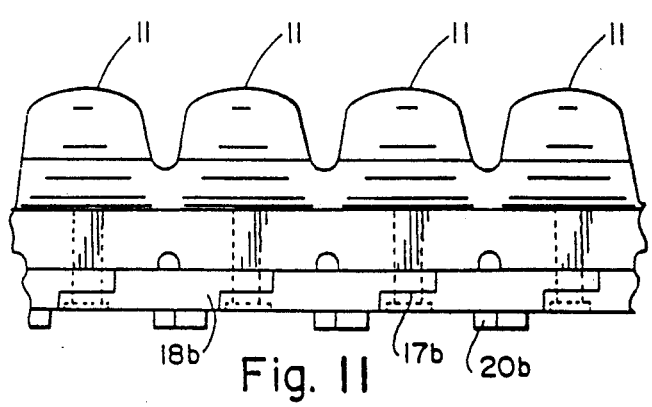
FIG. 11 is a partial longitudinal elevation view of the endless track of FIG. 2 equipped with another type of removable tread member.
Figure 12:
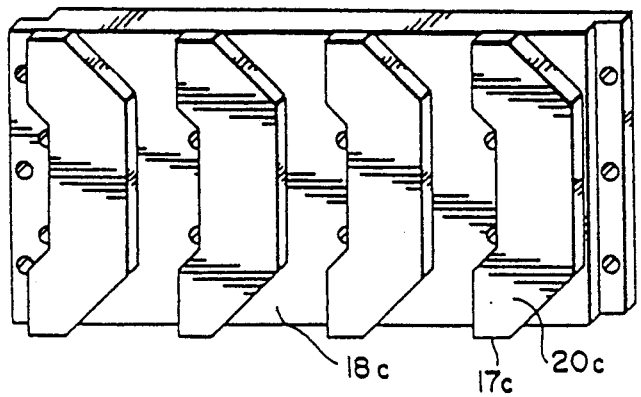
FIG. 12 is a perspective view of yet another removable tread member for use with the endless track of the present invention.

FIG. 11 depicts another type of removable polymeric tread member 17b, including a polymeric tread 20b molded with a polymeric backing plate 18b. Backing plate 18b dovetails with adjacent tread member backing plates, the overlapping ends of adjacent tread member backing plates being fastenable together with bolts or other fastening means into the base portions of corresponding drive members 11. FIG. 12 depicts yet still another removable polymeric tread member 17c with a polymeric tread 20c and a dovetailed polymeric backing plate 18c similar to FIG. 11, but having substantially greater length. Of course any of the polymeric treads or backing plates may be reinforced with cables or a bias-ply, fiber layer. Furthermore, metal treads also may be utilized, or metal backing plates may be provided with metal grouser bars. The type of tread and backing plate to be utilized, and the material of the chosen tread and backing plate, whether rubber, metal, polyurethane or other material, are functions of manufacture and the type of terrain over which the endless track drive vehicle is to be utilized.

Figure 14:
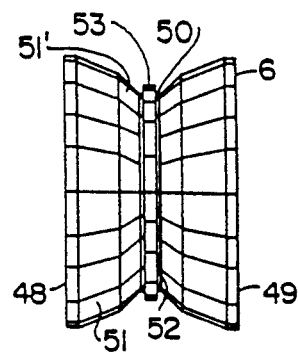
FIG. 14 is a side elevation view of the drive wheel and sprocket of FIG. 13.
Figure 15:
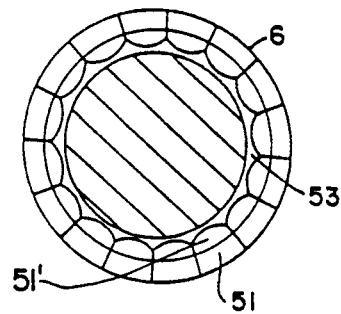
FIG. 15 is a further sectional view of the drive wheel and sprocket of FIG. 13 taken through the drive wheel axle.
Figure 17:
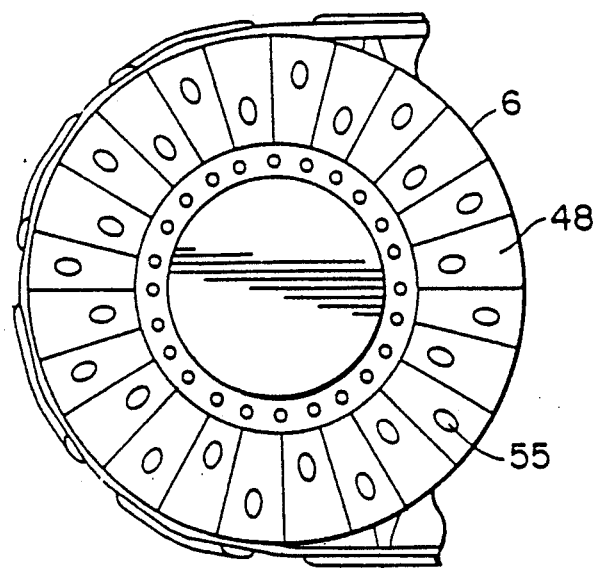
FIG. 17 is a front elevation view of a drive wheel in accordance with yet a further embodiment of the present invention incorporating debris escape holes.

FIGS. 14 and 15 depict a drive wheel 6 suitable for use in the endless track drive system in accordance with the present invention. Drive wheel 6 includes first and second side portions 48, 49 connected together by axle portion 50. Each side portion 48, 49 preferably includes interior drive surfaces 51 and 51' sloped and shaped to substantially match the angle and shape of drive faces 12 and 12' of drive members 11, respectively, for frictional engagement therewith. Axle 50 further preferably includes drive surfaces 52, the number, shape and size of which are determined by the configuration of drive members 11 and specifically drive faces 15 thereof which may engage with drive surfaces 52. Although the interior of drive wheel 6 preferably includes drive surfaces 51, 51' and 52 as discussed above, axle 50 may be deleted altogether, side portions 48 and 49 then being directly connected to one another and drive surfaces 51, 51' and/or 52 may also be eliminated. As will be appreciated, each drive wheel side portion 48, 49 may simply include one continuous drive surface sloped for engagement with either drive faces 12 or drive faces 12', or two continuous drive surfaces sloped for engagement with drive faces 12 and drive faces 12'. Furthermore, wheels 7 and 8 of track vehicle 1 may or may not contain interior drive surfaces corresponding to drive surfaces 51, 51' and 52 of drive wheel 6. Drive wheel 6 may also contain holes 55 as shown in FIG. 17 to permit escape of dirt and debris as may wheels 7 and 8 as well.

Figure 16:
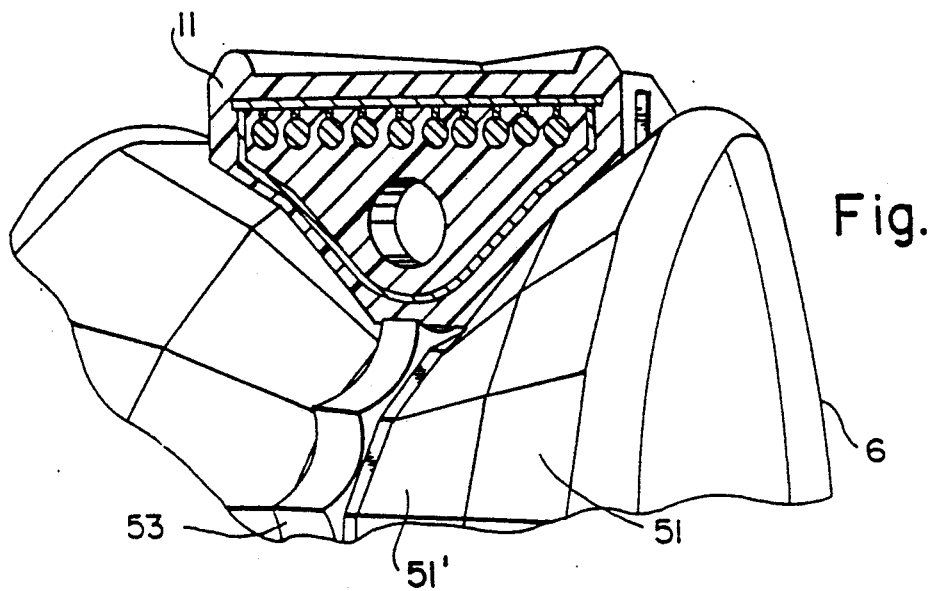
FIG. 16 is a perspective view, partially in cross-section, depicting the endless track of FIG. 2 in position on the drive wheel of FIGS. 13-15.

As depicted in FIGS. 13–15, drive wheel 6 may also include a sprocket 53 for further driving the endless track drive system. Sprocket 53 includes concave drive surfaces 54 which are configured for engagement with drive surfaces 15 of drive members 11. FIG. 16 depicts a drive member, 11 of drive track 3 engaging with interior drive surfaces 51, 51' and sprocket 53 of drive wheel 6. Of course, the sprocket may take other forms. For example, rounded bars may be added between drive surfaces 51, 51' of drive wheel side portions 48,49 to interfit between adjacent drive members to provide positive engagement therewith. By way of yet a further example drive pins may be provided extending from the tops of the drive members for positive engagement with spaced recesses in the drive wheel axle. Other possible sprocket arrangements will be appreciated from the above disclosure.

Figure 20:
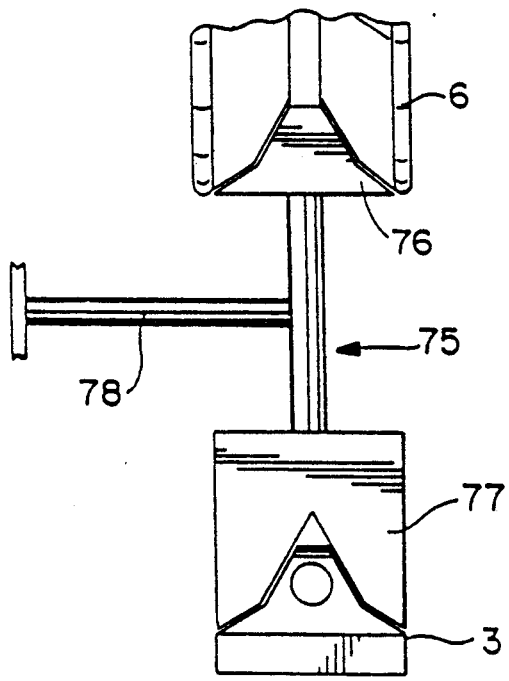
FIG. 20 is a front elevation view of a scraper tool usable with the endless track drive system of the present invention.

As depicted in FIG. 20, the endless track drive system also may be provided with one or more scrapers or sweepers 75 for removing dirt and debris from drive wheel 6, opposite end wheel 7, idler wheels or rollers 8 and/or the various drive faces on the drive members of the endless track. For example, scraper 75 may include an upwardly directed convex, inverted V-shaped scraper blade 76 with sides at two different angles with respect to horizontal, and a downwardly directed concave, inverted V-shaped scraper blade 77 with sides at two different angles with respect to horizontal, supported by a bracket 78 affixed on a supporting surface of the endless track drive vehicle. Thus, scraper 75 can be located so as to clean, for example, the drive wheel and endless track simultaneously, thereby preventing dirt and debris from interfering with the operation of the endless track drive system. With the structure shown in FIG. 20, any dirt scraped from drive wheel 6 will fall and be diverted by scraper blade 77 instead of becoming entrapped in the endless track. Of course, scraper 75 may be located at various positions on the endless track drive vehicle, may be provided with scraper blade 76 or 77 alone, and may be of a configuration other than as shown. Additionally, bristles, brushes or other cleaning instruments may be utilized in lieu of scraper blades 76 and 77.

The above-described endless track drive system is easy and cost-effective to manufacture. Optional base portions 9 of drive members 11 can be forged, cast or otherwise manufactured to the desired size, and optional support structures 16 and 69 can be affixed thereto by conventional means. Reinforcement members 4 can be suspended above a desired plurality of base portions 9, or otherwise suspended within a mold or other forming apparatus, and a suitable polymeric material molded or otherwise formed to encase the reinforcement members and provide a plurality of integral, interconnected drive members and tread members of desired configuration. Drive wheel 6 and sprocket 53 likewise easily can be manufactured through the use of known manufacturing techniques based upon the above disclosure of those features of the present invention.

The above-described endless track drive system is also easy and cost-effective to utilize. Since, in its preferred embodiment, the various drive members and tread members are integrally molded and interconnected into a single, closed loop endless track, the endless track can be simply installed and removed as a unit. Since the endless track is molded of a polymeric substance, with optional holes through the drive members to reduce polymeric mass, the endless track is relatively light-weight for ease and efficiency of installation and removal.

In accordance with the above, an improved endless track drive system is provided which can be easily and cost-effectively constructed and utilized, and which provides excellent operability.

Figure 18:
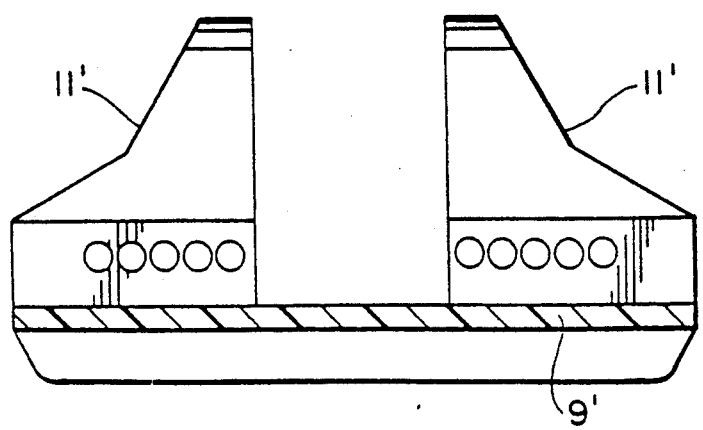
FIG. 18 is a transverse elevation view of an endless track drive member in accordance with yet a further embodiment of the present invention.
Figure 19:
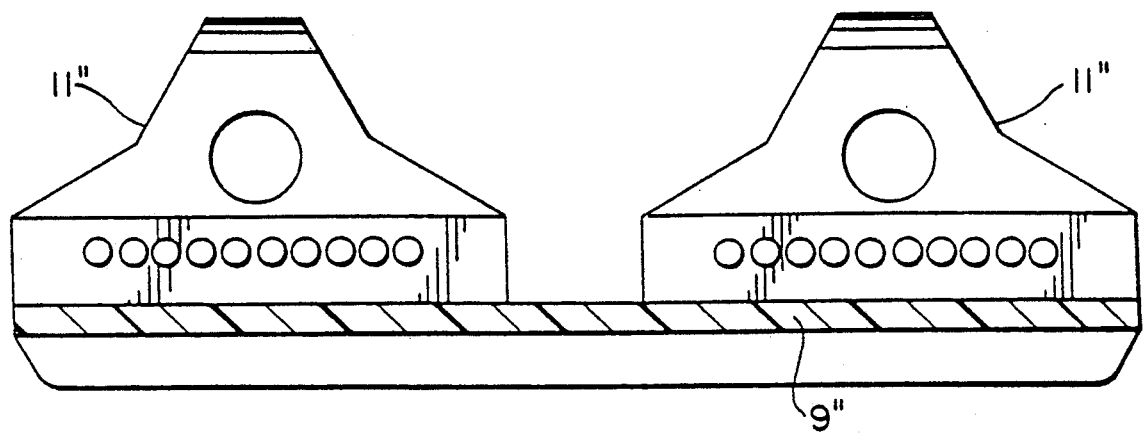
FIG. 19 is a transverse elevation view of an endless track drive member in accordance with still a further embodiment of the present invention.

Obviously, many modifications and variations to the disclosed endless track drive system are possible in light of the above teachings. For example, wider base portions 9', 9'' can be provided as depicted in FIGS. 18 and 19 to provide for vehicles requiring wider endless tracks. In such cases, the polymeric endless track drive members can each be molded in the form of half members 11' or double members 11''. Drive members 11' can be driven by a wider drive wheel or two properly spaced pneumatic driving tires. Drive members 11'' can be driven by two properly spaced drive wheels or four properly spaced pneumatic drive tires. Of course, the described tread members and scraper would have to be reconfigured accordingly to coordinate with drive members 11' and 11''. It is to be further understood that, within the scope of the appended claims, the invention also may be practiced otherwise then as specifically described. For example, the various aspects of the invention may be selected for combination in a number of permutations other than those shown and described.

Figure 22:
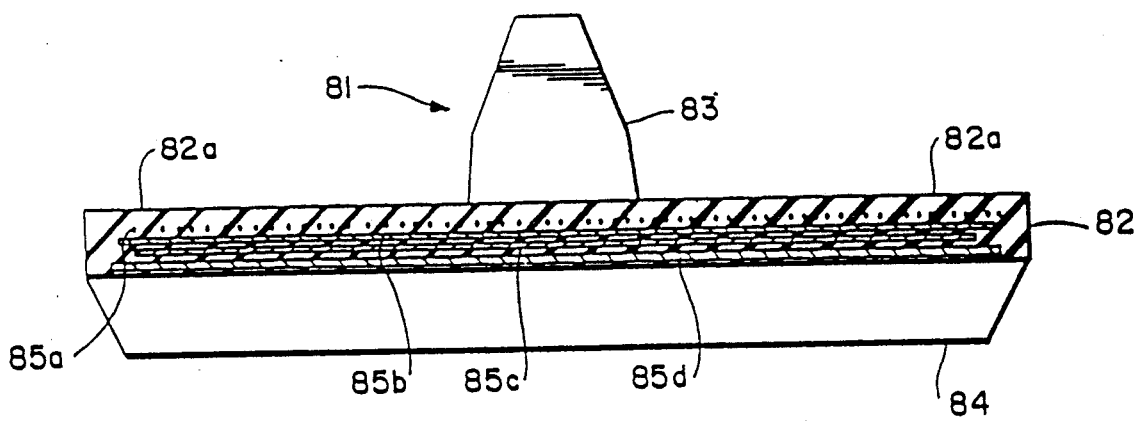
FIG. 22 is a transverse sectional view of the endless drive track of FIG. 21 taken between two guide members thereof.
Figure 23:
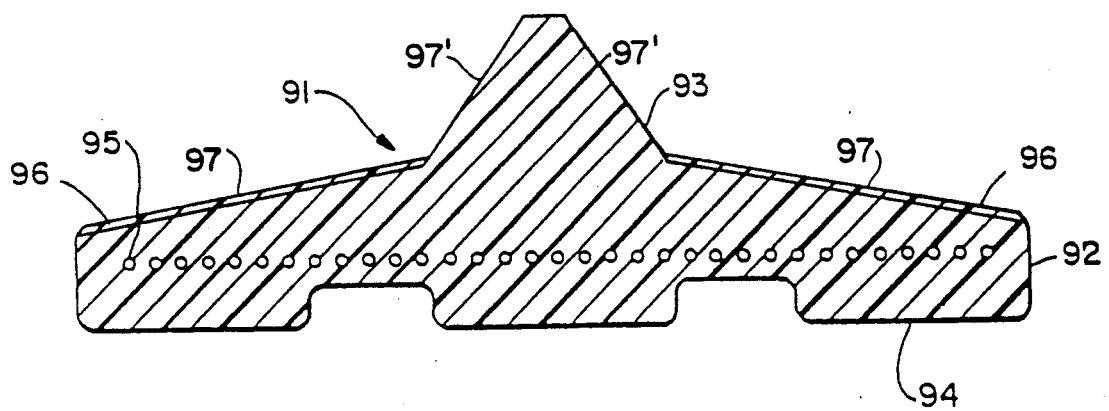
FIG. 23 is a transverse sectional view of a polymeric endless drive track in accordance with the present invention, similar to the endless drive track depicted in FIG. 2 but having the general configuration of the endless drive track depicted in FIGS. 21 and 22.

The above-disclosed endless track may be reshaped as depicted in FIG. 23 to generally conform to the shape of the friction drive elastomeric closed loop endless drive track which has been utilized on heavy duty track vehicles (see FIG. 22). As shown in FIG. 23, the endless track drive system 91 includes a drive track 92 with drive members 93, tread members 94 and reinforcement members 95, generally corresponding to members 82-85d of the track depicted in FIG. 22. Drive members 93 include sloping lateral drive faces 97 and 97' corresponding to lateral drive faces 12 and 12' of the first endless track embodiment, drive faces 97 being substituted in place of flat lands 82a of the FIG. 22 track. In contrast with guide members 83 of the FIG. 22 track, drive members 93 are preferably integrally formed with the endless track 92 in order to ensure that the drive members 93 are not broken away from the track 92, and they are otherwise constructed and shaped substantially the same as drive members 11 of the first embodiment discussed above. Furthermore, although endless drive track 92 can be made of various polymeric materials, it is preferable that the endless drive track 92 be molded of polyurethane or an equivalent high-strength plastic material in order to again provide adequate strength. Finally, grooves 96 (corresponding to and constructed similarly to grooves 100 of the first embodiment) optionally may be provided between drive members 93.

A drive wheel such as depicted in FIGS. 13-17 and discussed above may be utilized with the FIG. 23 track, with or without a sprocket. It is also preferable to again include holes 55 in drive wheel side portions 48, 49 to permit escape of any dirt and debris which does manage to infiltrate between the drive wheel, sprocket and drive members 93. Of course, any of the other above-disclosed elements of the first endless track embodiment can be incorporated into the endless track embodiment depicted in FIG. 23, including the base portions 9, support structures 16 and 69, holes 14, inwardly sloping front and rear edges 70, 71, any of the various disclosed tread members, and the scraper 75. The distance between drive members 93 in the longitudinal direction of the endless track may be varied, as it may be for the above-disclosed first endless track embodiment so long as sufficient space is provided to permit proper curvature about the sprocket/drive wheel and to permit escape of dirt and debris.

Figure 21:
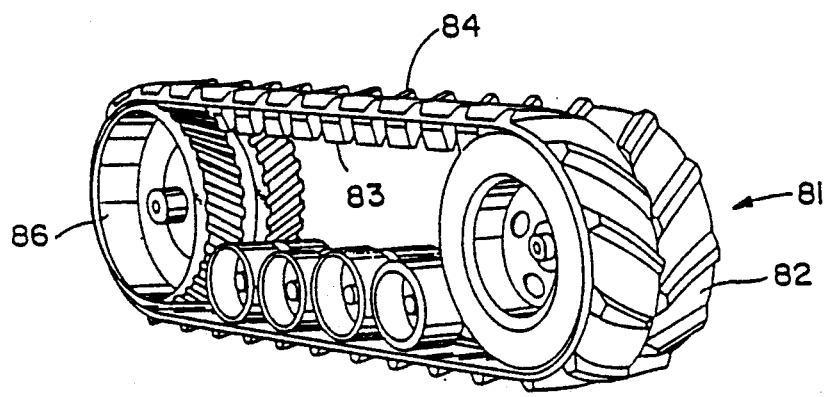
FIG. 21 is a perspective view of an endless track drive system having a friction drive elastomeric closed loop endless drive track driven by friction drive wheels engaged with horizontal surfaces of the drive track.

The endless track embodiment depicted in FIG. 23 has particular application to heavy duty track vehicles equipped with an endless track drive system as is disclosed in FIGS. 21 and 22. In order to expand the variety of terrains over which such track vehicles may be utilized, and to reduce both the influx of and detrimental effects of dirt and debris, such vehicles can be retrofitted with the endless track of FIG. 23. To accomplish the retrofit, the FIG. 23 polymeric track of the instant invention is substituted for the friction drive elastomeric track previously existing on such track vehicles, along with a corresponding drive wheel, either with or without a sprocket. It may or may not be necessary to also replace or modify the free wheels depending upon their construction. Once retrofitted in this manner, the heavy duty track vehicle is utilizable across additional terrains which it would not otherwise be able to traverse.

Although the above endless track embodiments have been disclosed as being closed loops, the endless track could also have two ends joined together by a master link such as is disclosed in FIGS. 24-26. In this case, cable ends at each end of the endless track are provided with spherical retaining members 101 (see FIG. 30) to be received in grooves 102-105 and recesses 106-109 in upper and lower base portion parts of a master link 110. The upper and lower base portion parts of master link 110 are then fastened together with a threaded bolt or other appropriate fastening means to sandwich retaining members 101 therebetween, thereby forming the endless track. Of course, more than one master link could be utilized in a given endless track.

FIG. 27 depicts master link 110 fastened in place between the ends of the endless track equipped with tread members as previously depicted in FIG. 11. FIG. 28 depicts an alternative master link 110' which is adapted to accommodate additional connector members extending from a continuous tread member similar to the one previously depicted in FIG. 12. These and other possible master link embodiments are disclosed in detail in U.S. application Ser. No. 049,819, filed May 14, 1987, the disclosure of which is fully incorporated herein by reference.

Figure 29:
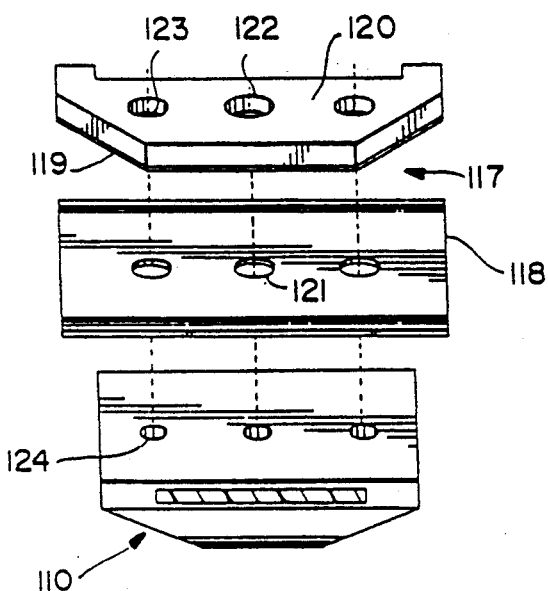
FIG. 29 is an exploded view of a master link base portion, removable backing plate and removable tread usable in the endless track drive system of the present invention.

FIG. 29 depicts a tread member 117 which may be utilized on the master link 110 in conjunction with utilization of the tread member of FIG. 10 on the endless track. Similarly to the tread member of FIG. 10, each master link tread member 117 includes a metal backing plate 118 and a polymeric tread 120 bonded to a metal supporting plate 119, each preferably having three unthreaded holes 121-123, respectively. The metal supporting plate 119 includes two outer holes 123 which are smaller than and concentric with the outer holes 122 in polymeric tread 120, such that the tread and backing plate can be removably fastened to the lower master link base portion part with suitable bolts or other fastening means received in two outer threaded holes 124 of the lower part. The center holes of tread 120, supporting plate 119 and backing plate 118 are all large enough that a suitable bolt or other fastening means can be passed therethrough and received in the center threaded hole 124 of the lower master link base portion part. In this way, tread member 117 can be removed from the master link without completely disconnecting the upper and lower base portion parts of the master link. Again, the details of this master link tread member are disclosed in detail in U.S. application Ser. No. 049,819 the disclosure of which is fully incorporated herein by reference.

Figure 31:
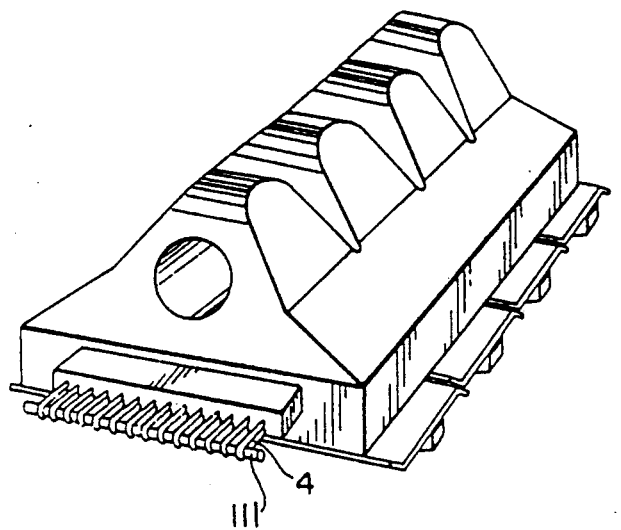
FIG. 31 depicts a partial endless drive track with a cable and retaining rod arrangement for utilization with the master link of the present invention.

Finally, as an alternative to utilization of spherical retaining members 101 for joining the cable ends of the endless track in the master link, a joint assembly such as disclosed in U.S. application Ser. Nos. 146,187 and 239,645, filed on Jan. 20, 1988 and Sept. 2, 1988, respectively (fully incorporated herein by reference), may be utilized. As shown in FIG. 31, a single cable 4 may be wound around grooved retaining rods 111 with the cable ends fastened within and enveloped by the molded endless track, or a plurality of cables 4 may be similarly looped around grooved retaining rods 111. The retaining rods 111 may then be retained between the upper and lower master link base portion parts as described above relative to spherical retaining members 101. In this way, the cable(s) to be utilized with the master link are greatly simplified and strengthened. Of course, as discussed above, reinforcement members made of other metals or materials such as nylon or other high strength light weight cord or fabric may be substituted for steel cables 4 in either of the FIG. 30 or FIG. 31 embodiments.

Thus, while only certain embodiments of the invention have been specifically described herein, it will be apparent that numerous modifications may be made thereto without departing from the spirit and scope of the invention.

What is claimed is:

1. An endless drive track comprising:
a plurality of endless track drive members each having at least one lateral side, said lateral side including first and second lateral frictional drive faces which intersect one another at an obtuse angle; and
means for connecting said drive members to one another to form said endless drive track.

2. The endless drive track of claim 1, said first lateral frictional drive face being positioned below said second lateral frictional drive face when said each drive member is in contact with the ground.

3. The endless drive track of claim 1, said plurality of drive members being integrally interconnected in a closed loop to form said endless drive track, and said connecting means comprising at least one continuous reinforcement member encased within and further interconnecting said plurality of drive members.

4. The endless drive track of claim 1, further comprising at least one master link joining adjacent ends of said plurality of drive members to form said endless drive track.

5. The endless drive track of claim 4, said connecting means comprising at least one reinforcement member wound around at least one retaining rod between said adjacent ends of said plurality of drive members, said at least one retaining rod corresponding to and being retained between cooperating recesses in upper and lower parts of said master link.

6. The endless drive track of claim 4, said connecting means comprising at least one reinforcement member having at least two ends retained by said at least one master link to form said endless drive track.

7. The endless drive track of claim 6, said at least two ends of said reinforcement member including retaining members corresponding to and being retained between cooperating recesses in upper and lower parts of said master link.

8. The endless drive track of claim 1, further comprising at least one tread member fixed to said plurality of drive members and extending in a direction opposite from said lateral frictional drive faces.

9. The endless drive track of claim 1, each said drive member further comprising a base portion and support structure extending from said base portion.

10. The endless drive track of claim 9, said support structure comprising a strap fixing said connecting means to said base portion.

11. An endless drive track comprising:
a substantially continuous first lateral frictional drive face on a lateral side of said endless drive track; and
a plurality of endless track drive members integrally interconnected with said first lateral frictional drive face and located above said first lateral frictional drive face when said endless drive track is in contact with the ground, each said drive member including a second lateral frictional drive face on said lateral side of said endless drive track, said second lateral frictional drive face intersecting with said first lateral frictional drive face at an obtuse angle.

12. The endless drive track of claim 11, further comprising means for increasing the flexibility of said endless drive track.

13. The endless drive track of claim 12, said flexibility increasing means comprising grooves formed between said drive members and through an upper portion of said first lateral frictional drive face.

14. An endless drive track comprising:
a plurality of polymeric endless track drive members each having at least two lateral sides, a first lateral side of each said drive member including first and third lateral frictional drive faces which intersect one another at a first obtuse angle, and a second lateral side of each said drive member including second and fourth lateral frictional drive faces which intersect one another at a second obtuse angle; and
means for connecting said drive members to one another to form said endless drive track.

15. The endless drive track of claim 14, said first and second lateral frictional drive faces being positioned below said third and fourth lateral frictional drive faces when said each drive member is in contact with the ground.

16. The endless drive track of claim 15, said second obtuse angle being equal to said first obtuse angle.

17. The endless drive track of claim 14, each said drive member further including an upper drive face between said third and fourth lateral frictional drive faces.

18. An endless drive track comprising:
first and second substantially continuous lateral frictional drive faces on first and second lateral sides of said endless drive track, respectively; and
a plurality of polymeric endless track drive members integrally interconnected with said first and second lateral frictional drive faces and located above said first and second lateral frictional drive faces when said endless drive track is in contact with the ground, each said drive member including third and fourth lateral frictional drive faces on said first and second lateral sides of said endless drive track, respectively, said third and fourth lateral frictional drive faces intersecting respectively with said first and second lateral frictional drive faces at first and second obtuse angles.

19. The endless drive track of claim 18, further comprising grooves formed between said drive members and through upper portions of said first and second lateral frictional drive faces.

20. An endless track drive system comprising:
a plurality of polymeric endless track drive members each having at least one lateral side, said lateral side including first and second lateral frictional drive faces which intersect one another at an obtuse angle;
means for connecting said drive members to one another to form an endless drive track; and
a drive wheel for driving said endless drive track, said drive wheel including a first drive surface for frictional engagement with said first lateral frictional drive face, and a second drive surface for frictional engagement with said second lateral frictional drive face.

21. The endless track drive system of claim 20, said first lateral frictional drive face being positioned below said second lateral frictional drive face when said each drive member is in contact with the ground.

22. The endless track drive system of claim 20, said drive wheel including a plurality of first drive surfaces and a plurality of second drive surfaces, each said first drive surface being constructed to substantially match the slope and shape of said first lateral frictional drive face of each said drive member for frictional engagement therewith, and each said second drive surface being constructed to substantially match the slope and shape of said second lateral frictional drive face of each said drive member for frictional engagement therewith.

23. The endless track drive system of claim 20, further comprising sprocket means for further driving said drive members.

24. The endless track drive system of claim 20, further comprising scraper means for scraping dirt and debris from said endless drive track, said scraper means being shaped to conform to a transverse profile of said drive members.

25. The endless track drive system of claim 24, said scraper means including means for simultaneously scraping dirt and debris from said drive wheel and said endless drive track, portions of said scraper means being shaped to conform to transverse profiles of said drive wheel and said drive members.

26. An endless track drive system comprising:
a plurality of polymeric endless track drive members each having at least two lateral sides, a first lateral side of each said drive member including first and third lateral frictional drive faces which intersect one another at a first obtuse angle, and a second lateral side of each said drive member including second and fourth lateral frictional drive faces which intersect one another at a second obtuse angle;
means for connecting said drive members to one another to form an endless drive track; and
a drive wheel for driving said endless drive track, said drive wheel including first and second drive surfaces for frictional engagement with said first and second frictional drive faces, and third and fourth drive surfaces for frictional engagement with said third and fourth lateral frictional drive faces.

27. The endless track drive system of claim 26, said first and second lateral frictional drive faces being positioned below said third and fourth lateral frictional drive faces when said each drive member is in contact with the ground.

28. The endless track drive system of claim 27, said second obtuse angle being equal to said first obtuse angle.

29. The endless track drive system of claim 26, said drive wheel including a plurality of first, second, third and fourth drive surfaces, each said first, second, third and fourth drive surface being constructed to substantially match the slope and shape of said first, second, third and fourth lateral frictional drive faces of each said drive member, respectively, for frictional engagement therewith.

30. The endless track drive system of claim 26, said drive wheel including first and second side portions and an axle portion connecting said first and second side portions, and each said drive member including an upper frictional drive face between said third and fourth lateral frictional drive faces, said axle portion of said drive wheel including a plurality of drive surfaces for frictional engagement with said upper frictional drive faces of said plurality of drive members.

31. The endless track drive system of claim 26, said drive wheel including first and second side portions and an axle portion connecting said first and second side portions, and each said drive member including an upper drive face between said third and fourth lateral frictional drive faces, said axle portion of said drive wheel including a sprocket shaped to substantially match and engage with said upper drive faces of said plurality of drive members.

* * * * *